Figure 1:
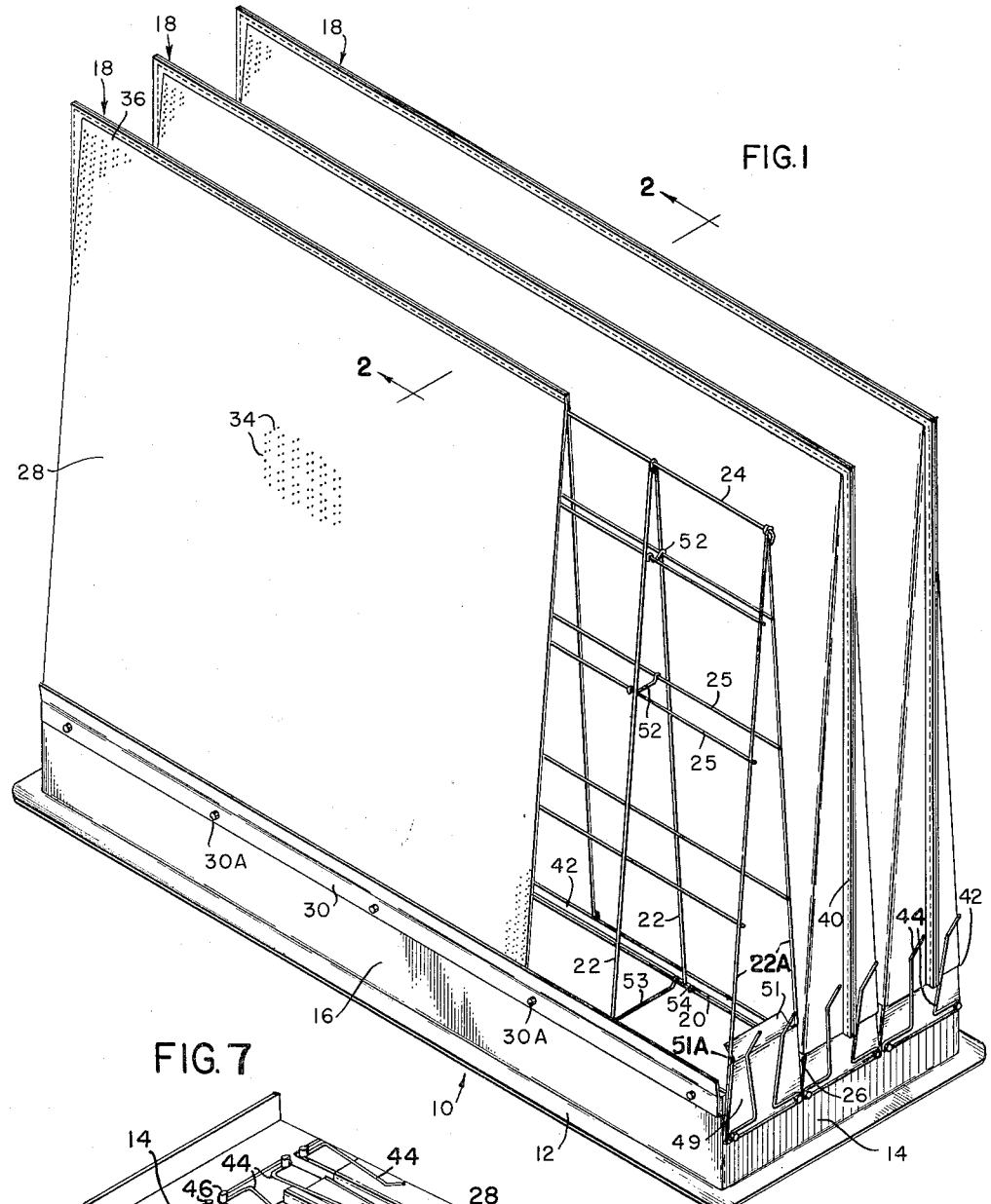

March 27, 1962 W. A. STEVENS ETAL 3,026,967
AIR FILTER

Filed March 6, 1959 3 Sheets-Sheet 1

INVENTORS
W. A. STEVENS
LLOYD H. ROBEN
BY
ATTORNEY

March 27, 1962 W. A. STEVENS ETAL 3,026,967
AIR FILTER
Filed March 6, 1959 3 Sheets-Sheet 2
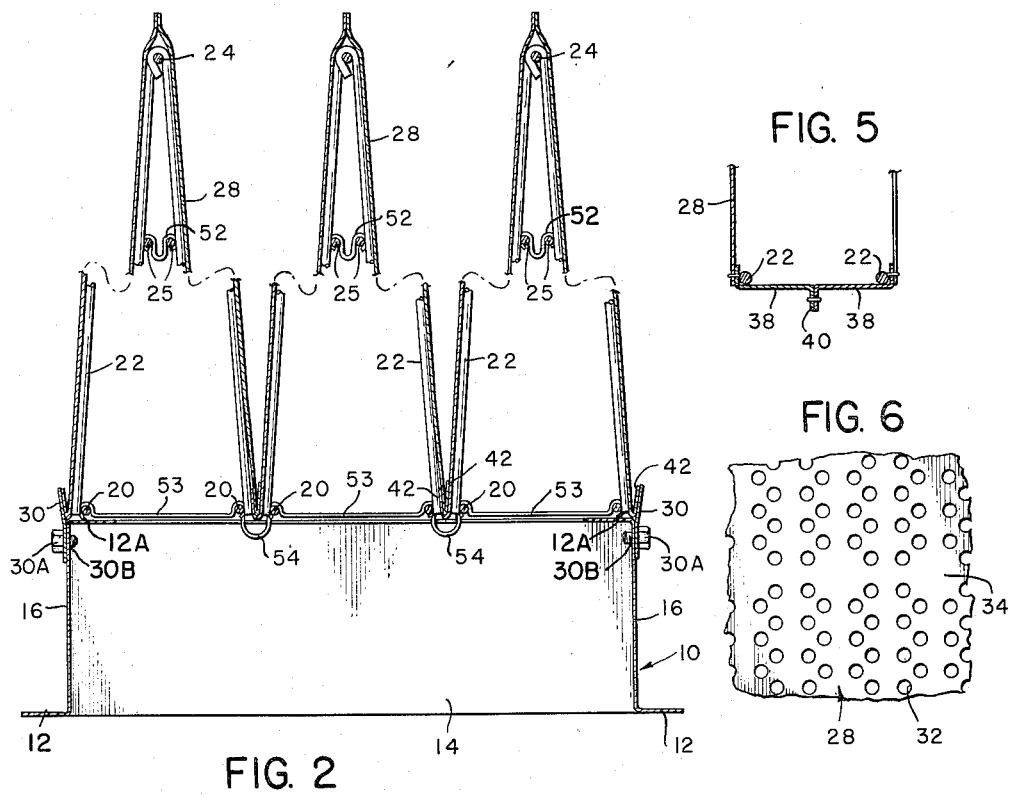
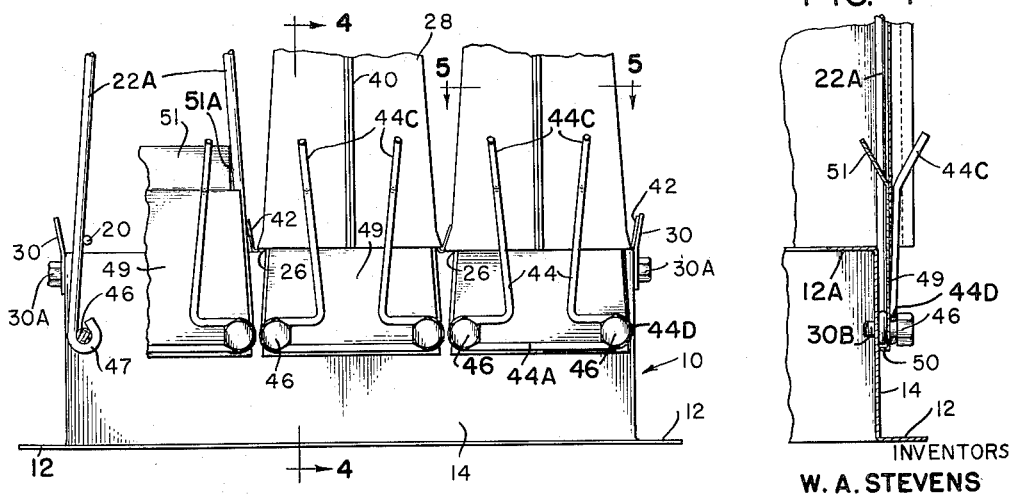
INVENTORS
W. A. STEVENS
LLOYD H. ROBEN
BY *A. Yates Dowell*
ATTORNEY

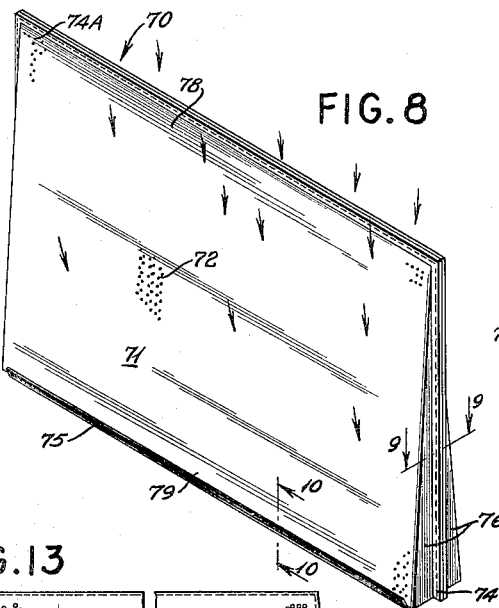
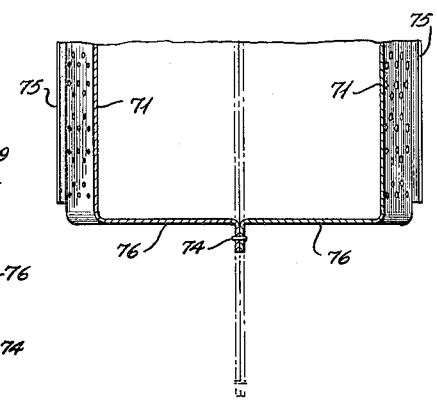
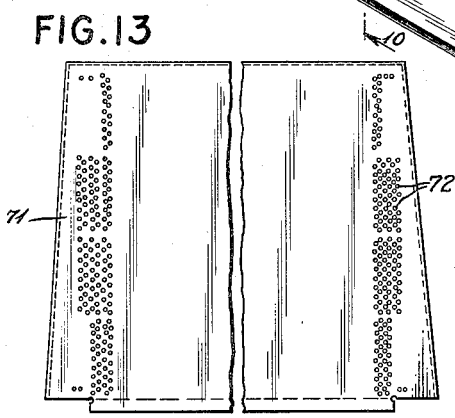
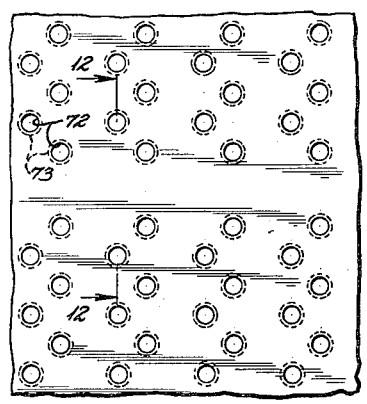
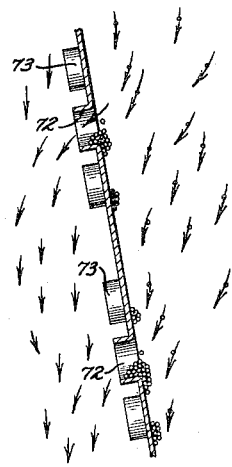
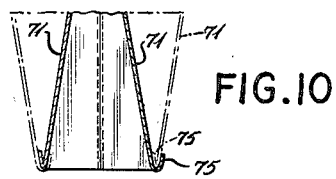

United States Patent Office 3,026,967
Patented Mar. 27, 1962

3,026,967
AIR FILTER
William A. Stevens, Houston, Tex., and Lloyd H. Roben, Vidalia, Ga., assignors to Georgia Tool & Engineering Co., Vidalia, Ga.
Filed Mar. 6, 1959, Ser. No. 797,800
22 Claims. (Cl. 183—44)

The present invention relates to filter units and more particularly to filters suitable for use in cotton mills.

Cotton mills present serious and unusually difficult problems in air conditioning. For proper handling of the cotton during various operations it is essential that the operation be carried out under conditions of very high humidity and in order to maintain this high humidity especially in winter it is the usual practice to circulate the air within the mill and add the necessary moisture as the air is circulated.

The various mill operations free a substantial amount of dust, lint and sizing in the air and to maintain healthful conditions, efficient workmanship and product uniformity it is necessary to filter this air as it is recirculated. Under the conditions of extremely high humidity, the dust, lint and sizing become damp and sticky and constitute an unusually difficult air filtering problem.

For many years efforts have been made to provide satisfactory filters for such mills. Filters have been provided which are reasonably efficient in removing dust, lint, sizing and other foreign particles but due to the nature, characteristics and amount of foreign matter in the air these filters require such frequent and thorough cleaning that maintenance of the filters in operative condition is a costly item.

Flat filters, under operating conditions in cotton mills, may clog and require cleaning or replacement as frequently as once every hour. As the screen clogs and passes less air it may become impossible to add sufficient moisture to the reduced air volume in order to prevent the humidity from falling below suitable operating conditions. Even with frequent cleaning which ordinarily involves washing by hand, the air volume and consequently, the humidity conditions, are constantly varying so that uniformity of the product is difficult to maintain.

When efforts have been made to provide filters which are more easily cleaned, the filters have been less efficient in removing foreign particles from the air and these foreign particles collect and clog the air ducts, and other parts of the circulating system. The circulating system does not require as frequent cleaning as an efficient filter but the cleaning of the circulating system is far more costly and may even require partial dismantling of the system.

One of the objects of the present invention is to provide a filter which will efficiently remove foreign particles from the air even under the adverse conditions of a cotton mill.

Another object of the present invention is to provide an air filter which is relatively non-clogging so that it will pass air under the conditions met in a cotton mill over long periods of time without substantially interfering with the flow of air.

Another object is to provide an air filter which can be quickly and conveniently cleaned under the adverse conditions in a cotton mill.

A further object is to provide a simple, inexpensive and efficient air filter.

Another object is to provide a simple, efficient inexpensive filtering unit of paper or the like.

Another object is to provide an air filter having independent filtering units which may be quickly and conveniently removed and replaced.

A further object is to provide a tent shaped filtering unit for application to a filter receiving frame to provide for ease of cleaning.

A still further object is to provide a filter member having openings therethrough of sufficient size to avoid excessive power requirements and having sufficient unperforated portions to collect large quantities of dust and lint to reduce the time that cleaning is necessary.

Figure 7:
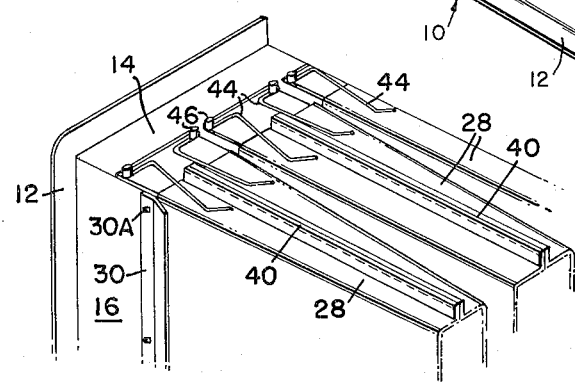

These and other objects and advantages reside in certain novel features of construction, arrangement and combination of parts as will hereinafter be more fully set forth and pointed out in the appended claims. Referring to the drawings:

FIG. 1 is a perspective view with parts broken away of a complete filter assembly according to the present invention;

FIG. 2, a transverse section taken substantially on line 2—2 of FIG. 1;

FIG. 3, an end view of the filter unit with parts broken away and parts in section to more clearly illustrate the attachment of the tent shaped filter elements to the supporting frame and base;

FIG. 4, a fragmentary section taken substantially on line 4—4 of FIG. 3 showing the gripping action of the clips on the tent shaped filter elements;

FIG. 5, a fragmentary section of an end of a modified form of tent shaped filter unit showing the end supporting rafters of the roof like frame;

FIG. 6, an enlarged detail of the filter shape showing the staggered arrangement of holes and the reinforcing imperforate portions;

FIG. 7, a fragmentary view of a bank of filters made according to the present invention and showing them in operative position with the perforated wall and the ridge of the tent shape filter members substantially vertical to provide for ease of cleaning;

FIG. 8, an isometric view of a tent shaped filter element made of two trapezoidal sheets of stencil board and having perforations in an area spaced from the ridge, verge and eave edges and being assembled by a seam around three edges thereof;

FIG. 9, a fragmentary section taken substantially on line 9—9 of FIG. 8 showing in dotted lines how the filter element is in flat condition before use and for stacking for shipment;

FIG. 10, a fragmentary section taken substantially on line 10—10 of FIG. 9 showing how the adjacent filter elements are interlocked at their eave edges;

FIG. 11, an enlarged detail of the perforated portions of the stencil sheets of the tent shaped filter element showing the arrangement of holes and showing the unperforated marginal portions which provide for increased strength;

FIG. 12, an enlarged fragmentary section of the stencil board sheet taken substantially on line 12—12 of FIG. 11; and FIG. 13, a plan view of the filter element in flat condition suitable for shipment.

In general the filter of the present invention comprises a rectangular frame indicated generally at 10 which is provided with an outwardly extending flange 12 so that it may be conveniently secured over the intake opening of an air conditioning system. It is apparent that the frame 10 will be shaped so as to cover the intake opening of the system, but ordinarily these openings are rectangular.

The frame 10 has top and bottom walls 14, and side walls 16 of generally Z-shape section and a plurality of V-shaped filter units indicated generally at 18 are secured to, and project outwardly from the frame 10. The top and bottom walls 14 and the side walls 16 each have an outwardly extending flange 12 at one edge of the wall and an inwardly extending flange 12A at the other edge of the wall, thereby making the Z-shaped cross section clearly shown in FIG. 4.

Each filter unit 18 comprises a suitable rigid supporting skeleton formed so that it will not materially interfere with the flow of air. This supporting skeleton may take various forms and one preferred form is shown in the drawing in which a plurality of spaced parallel supporting rods 20 are rigidly secured between the top and bottom walls 14 of the frame 10 and extend entirely across the open interior of the frame. The V-shaped units are formed by pairs of rafters or rods 22 which project outwardly from the frame 10. The end pairs of verge rafters or rods 22A are longer and secured at their lower ends in spaced relation to the wall 14 and the intermediate pairs of rods 22 are secured to the transverse supporting rods or eave braces 20 which define the eave edges of the skeleton frame structure as shown in FIGURES 1 and 2. At their outer or converging ends the rods 22, 22A are secured to a transverse brace or ridge rod 24 which forms the apex of each V-shaped skeleton frame unit. As many V-shaped pairs of intermediate rafter elements or rods 22 with end or verge rafters or rods 22A are provided to adequately support the filter element, and intermediate transverse reinforcing rods or braces 25 may be used as are necessary to give the supporting skeleton frame structure the necessary rigidity. Slots indicated at 26 formed by the spacing between plates 49 in FIGURES 1 and 3 receive the eave edges of the tent shape paper filter member 28 so that the filter member can extend down to the walls 14. Sheet metal lips 30 extend outwardly from the end walls 16 to cover the bottom outer edge of the outside filter members. These lips 30 may be either formed integrally with the walls 16 or may be removable as shown in FIGURES 1 to 3 inclusive and 7 by the use of removable threaded fasteners 30A such as self threading screws or the like. The apertures in the walls for such screws are formed in the side walls 16 by an extrusion process which increases the effective thickness of the material from such extrusion process. The extrusion process is accomplished by a type of punching process which provides an inwardly extending flange 30B (FIG. 2) thereby permitting the use of thin stainless steel metal of a thickness of .065 inch for the rectangular frame 10.

The rods 22 and 22A form a plurality of parallel V-shaped structures extending outwardly from the frame 10 from one side wall 16 to the other. It has been found that a satisfactory size for these V-shaped units is a 4-inch dimension at the open or eave base end and a 36-inch dimension along the ridge of the tent shaped filter member 28, the dimension from the ridge 24 to the metal lip 30 being 24" for example. The angle of the V should be sharp and the perforations in the filter member should be small so that substantially no air passes through the filter without a sharp change in direction.

The filter member 28 is preferably formed of strong paper having a reasonably smooth surface. In order to maintain the strength of the paper, it is perforated in blocks leaving imperforate sections 34 between the blocks and an imperforate border 36 where the paper unit engages the rods 20 and 22.

Each paper filter 28 is formed into a V by stitching a paper member 38 along the ends of the V as shown in the modification of FIGURE 5 and these members 38 are stitched together as indicated at 40 to form an outwardly projecting edge. The paper units are also provided at the open end with up-turned edges 42 as shown in FIGURE 2.

Along the top and bottom walls 14 of the frame 10, there are provided a pair of spring fingers 44 in alignment with each V-shaped support frame. These spring fingers 44 may be formed of a single piece of wire forming a generally U-shaped filter element retaining clip secured to the walls 14 of the frame 10 by bolts 46 as shown in FIGURES 1 and 4. Spring fingers 44 of each clip are formed of a single piece of spring wire having a first portion or cross member 44A extending between bolts 46, eye portions 44D extending around bolts 46, inwardly extending portions 44B, then upwardly extending spring fingers 44, and then upwardly and outwardly flared end portions 44C which provide for a flaring relation with respect to the inwardly extending flange 51 of the plates 49.

The tent shape filter members shown in FIGURES 1, 2, 3 and 4, are made of two pieces of paper of generally trapezoidal shape secured together along the short base and the side edges to form the outwardly projecting flange edge 40 to assist in applying and removing the filter members.

Struts 52 extend between longitudinal braces 25 to maintain the roof sections of the skeleton shaped support in accurate relation while struts 53 extend between the eave braces 20 of the skeleton shaped support to maintain a fixed distance therebetween. Struts 53 cooperate with U-shaped elements 54 serving to maintain accurate total width to the series of skeleton supports so that sufficient force is applied between the eave ends of the rafters 22 on the outside skeleton supports against the angle members 30 preventing objectionable noise resulting from vibration of the parts.

The plates 49 with the flange 51 and notches 51A are mounted loosely by means of the attaching bolts 46 over the large eye ends of the verge rafters 22A which loosely surround the bolts 46 where more than one skeleton support is mounted on a single rectangular frame, the U-shaped clips 54 having eyes at the free end of the legs are secured to eave braces 20 to maintain the adjacent skeleton supports in proper operative relation while permitting the flanges 75 of the filter elements to interengage. The bolts 46 also pass through the elongated eyes 44D in the clips. Wedges are temporarily placed between the verge rafters of adjacent skeleton supports to positively bring such verge rafters into accurate spaced relation by the distance determined by the notches of the plate 49 engaging the verge rafters of the same skeleton support and when all of the skeleton supports are in position with the wedges maintaining the verge rafters in the notches the bolts 46 are drawn up tightly to retain the verge rafters in the notches in accurately spaced relation thereby assuring an accurate periphery of the base of the skeleton frame.

This accurate periphery is important to assure satisfactory operative contact of the stencil board or paper filter on the skeleton supports. If the inner periphery of the filter element is smaller than the periphery of the skeleton support the filter element will tear and if the inner periphery of the filter element is greater than the periphery of the skeleton support, there will be looseness resulting in passages which permit uncleaned air to pass from one side of the filter to the other without the benefit of the filtering effect.

A tent-shaped paper filter unit is placed over each skeleton frame unit and the paper is pressed down and clamped in position by the spring fingers 44 which engage the gusset-shaped members 38 on opposite sides of the sewn edge 40. When the adjacent paper filter unit is placed on the adjacent frame work, the folded eave edge 42 of one member fits into the folded eave edge 42 of the adjacent member as shown in FIGURE 2, so that no air can pass between the adjacent units.

It has been found that perforations $\frac{1}{16}$ inch in diameter staggered on $\frac{7}{64}$ inch centers are satisfactory. Due to the very steep angle of the V-shaped units 18, air entering the unit makes a substantially right angle turn and inertia causes foreign matter such as lint, dust, sizing and the like to pass beyond the opening and collect on the surface of the paper. Thus, the filter of the present invention does not tend to clog and even when the filter becomes dirty, it does not substantially decrease the air flow. This result is not due to the increase in filtering area because while the filtering area of the filter of the present invention is approximately 24 times the filtering area of a flat screen for the same size intake, the screen of the present invention can be operated without cleaning up to 72 times as long as a flat screen. Thus the clogging effect of the screen of the present invention is approximately 1/3 of that of a flat screen of equal filtering area.

When the individual perforations 32 are substantially smaller than 1/16 inch, they tend to clog more rapidly and when they are substantially larger than 1/16 inch foreign particles pass through the filter. Due to the construction of the filter, foreign particles pile up in back of each perforation and hence successive rows of perforations are staggered as shown in FIGURE 6 so that particles piling up behind one perforation will not clog the next perforation.

The paper should be strong and thicknesses of 0.019 to 0.030 inch are satisfactory. The smoother the paper surface the less strongly the lint, sizing and other foreign matter tend to adhere to the surface. It has been found that when the paper is coated with a smooth, waxy material such as the polytetrafluoroethylene sold under the trade-mark "Teflon," the filter may be cleaned by cutting off the air and merely shaking the filter. Even when the paper surface is uncoated, the filter may be cleaned by merely wiping the surface.

Although paper has been found quite satisfactory for the filter member, longer lasting filter members are made of canary oiled stencil board made from a high density bleach kraft board manufactured from a soft wood fiber to which is added a small amount of yellow die. The board is treated with a 14 to 18% blend of mineral and oxidizing oils. It is made of 15½ caliper plus or minus 5%. The filter members shown in FIGS. 8 to 12 inclusive are made of such stencil board and it will be noted that the stencil board is perforated from the outside surface of the tent shaped filter member 70 inwardly. The filter member 70 is formed of stencil board sheets 71, 71 having perforations 72 formed therein by a punching operation which forms an inwardly extending flange 73 around the periphery of each perforation 72 and it will be noted that the perforations are formed in a central portion of the trapezoidal shaped stencil board sheets with the perforations arranged in rows with the holes in the adjacent rows staggered so the holes 72 are spaced about 7/64" center to center and the holes are approximately 1/16" in diameter.

In the manufacture of the filter member 70, the perforated stencil board sheets 71 are cut in the trapezoidal shape down in FIGS. 8 and 13 and are temporarily secured together by means of staples or the like passing through the unperforated margin at the ends of the short base of the trapezoid and at the ends of the long base and are then sewed with suitable stitching 74 around the slant side edges and the short base edge of the trapezoidal sheets 71, 71. After the sewing the staples are removed leaving small apertures 74A. The long base of the trapezoidal shaped stencil board is provided with a marginal flange portion 75 which is adapted to embrace or be embraced by the flange 75 of an adjacent filter element as shown in FIG. 10. A circular notch is provided at the ends of the fold line to prevent tearing. It will be noted that the end sections 76 of the stencil board sheets 71, 71 are free of perforations so that such unperforated end portions will be adapted to engage the end or verge rafter rods 22A of each supporting skeleton thereby reducing danger of tearing because of weakening resulting from the perforations in the stencil board. The unperforated portions serve as handle portions which may be gripped by the hands in applying and removing the filter members from the supports. Similarly it will be noted that the upper edge portion 78 and the lower edge portion 79 are free of perforations to increase the strength thereof. The end gusset members or sections 76, 76 are secured by the stitching 74 and the flanges 75 defining the eave edges can be turned flat for facilitating packaging as shown in FIG. 8 and when the filter member is placed on the supporting skeleton it is only necessary to open the long base edge of the filter members and thread them onto the appropriate supporting skeleton, the unperforated end portions 76 of the filter member can engage the verge rafters 22A without any danger of tearing because the perforations are located appreciably inwardly therefrom in the stencil board sheets.

This stencil board form of the filter member has many advantages in the manufacture thereof as well as in the more efficient operation including durability and ease of cleaning. This can be performed with a brush without danger of damage to the filter. Also, the stencil board is not objectionably affected by moisture.

The bank of filters shown in FIGURE 7 is arranged in the position shown so that air is drawn directly out of the room into the filter elements thereby avoiding expensive duct work in the room. It will be evident that the filters can be placed in ducts, however with the ridge extending into the stream of air flowing in a direction from the ridge toward the eave base.

Because of the skeleton construction and use of collapsible paper filter members the filter of the present invention is very light and should a single paper filter unit be torn or perforated it can be readily and economically replaced without affecting the remaining units. The filter is mounted with the apices of the V's facing the incoming air and the V's may be in substantially any position, but generally it is preferable to have the V's positioned so that the flat filtering surfaces are substantially vertical. When mounted in this position the filter may be quickly and easily cleaned by merely brushing the vertical surfaces.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the valid interpretation of the claims are therefore intended to be embraced therein.

What is claimed is:

1. An air filter comprising a frame, a plurality of parallel V-shaped support members extending across and projecting outward from said frame, and a pre-formed V-shaped filter member removably mounted on each support, said filter member being formed of smooth, non-porous paper provided with a plurality of small perforations to permit the passage of air the ratio of the altitude of said V-shaped support members and V-shaped filter member to the widths of their bases being approximately 9 to 1.

2. An air filter as defined in claim 1 including means secured to said frame for releasably securing said filter members on said support members.

3. An air filter unit for filtering an air stream comprising a paper sheet 0.019 to 0.030 inch thick having a plurality of staggered perforations substantially 1/16 inch in diameter, and means for supporting said sheet at an angle of about 3° to the direction of the air stream.

4. An air filter unit as defined in claim 3 in which the paper sheet is coated with a resin.

5. An air filter comprising a frame, a plurality of generally V-shaped support members extending across and projecting outward from said frame, and a pre-formed complementary generally V-shaped filter member removably mounted on each support member, said filter member being formed of flexible impervious pulped material provided with a plurality of small perforations to permit the passage of air, said filter member including an upwardly and outwardly bent portion extending along at least one outer edge at the open end of the V-shaped filter member to form a substantially air tight seal between adjacent filter members.

6. An air filter as set out in claim 5, wherein the ratio of the altitude of said V-shaped filter member to the width of its base is approximately 9 to 1.

7. An air filter as set out in claim 6 wherein said material is 0.019 to 0.030 inch thick and said perforations are staggered and substantially 1/16 inch in diameter.

8. An air filter comprising a frame, a plurality of V-shaped support members extending across and projecting outward from said frame, and a pre-formed V-shaped filter member removably mounted on each support member and including closure means permanently secured along the V-shaped edges of the filter members to form a V-shaped bag, means secured to said frame for releasably securing said filter members on said support members, said frame being slotted to receive the edges of said V-shaped bag so that a portion of said frame extends within said bag.

9. A filter for use in multiple units comprising a generally rectangular frame, each end of said frame having an outwardly flaring lip on one edge for receiving an eave edge of a tent shaped filter element, each side having a plurality of slots extending inwardly from one edge corresponding to the said one edge of said end toward the other edge for receiving an eave portion of a tent shaped filter element, a plurality of filter element retaining clips mounted on each side between adjacent slots, a plurality of gable shaped skeleton supports, each support having transverse eave base members extending between said sides and having rafters extending from said transverse eave base members upwardly, a ridge member connecting said rafter members, a tent shaped filter element comprising a panel of a size to overlie one roof section of said gable shaped skeleton support and a ridge connected panel to cover the other roof section of said gable shaped skeleton support, a gusset connecting the verge edges of each pair of panels covering a gable shaped skeleton support, said gusset including an intermediate outwardly extending rib, said gussets and panels forming said tent shaped filter element, the eave edges of said panels being folded back to provide a V-shaped folded edge, said tent elements being adapted to be placed on said gable shaped skeleton supports and removed therefrom, the folded eave edge of each panel nesting within the folded eave edge of the next adjacent panel of the adjacent tent shaped filter element.

10. A tent shaped filter element comprising a first flexible perforated panel of a size to overlie one section of a gable shaped support, another panel connected to said first panel to cover the other side of a gable shaped support, gussets connecting the verge edges of said panels, an outwardly extending rib on each gusset to provide a manipulating handle, the eave edges of said panels being folded back to provide a folded edge for nested connection with a folded eave edge of another similar filter element.

11. A tent shaped filter for use with or without a support comprising a pair of isosceles trapezoidal sheets of stencil board treated to provide a hard finish oiled surface, said stencil board sheets being of high density bleached kraft board manufactured from soft wood fiber to which is added a small amount of yellow dye and treated with a 14 to 18% blend of mineral and oxidizing oil and made to a 15½ point caliper plus or minus 5%, said stencil board sheets being provided with perforations over substantially their entire area with each perforation having a flange therearound on one side of the perforation to provide a dust retaining ledge, said sheets of stencil board being sewn together with a single seam joining the edges on the short base and sides, said sheets being unconnected on the long base edge to open sufficiently to receive a gable-shaped skeleton support, the perforations in said stencil board being arranged so that the flanges of the perforations extend inwardly of the stencil board sheets, the long base edge of each stencil board sheet being provided with a folded portion to provide for interfitting of similar stencil board tent-shaped filter elements to assure complete closure between adjacent tent shaped filter elements for the passage of air therethrough so that all the air must pass through the perforation from the unflanged side of the sheets to the flanged side.

12. The invention according to claim 11 in which the perforations are arranged in a central portion only in rows parallel to said bases with the rows of perforations in the mid-portion between the bases having at each end two perforations more than the rows adjacent the short base and having at each end four perforations more than the rows adjacent the long base.

13. A filter assembly comprising a substantially rectangular hollow frame having Z-shaped top, bottom and side walls, a lip secured to one edge of each side wall adjacent the inturned flange and diverging therefrom, a plurality of skeleton supports extending in the direction of divergence of said lips and mounted on the top and bottom walls of said frame, guide plates positioned on the top and bottom walls of said frame, said skeleton supports having a plurality of rafter elements, ridge elements, and longitudinal braces between said rafter elements, the verge rafter elements being longer than intermediate rafter elements and secured to the top and bottom walls, and link braces extending between said longitudinal braces to maintain said skeleton support in operative condition, plates on said top and bottom walls having converging lips and spaced from adjacent plates to provide filter member receiving slots, and spring clips outwardly of said plates and diverging outwardly from said sides for the ends of tent shaped filter members, and filter members on said supports, said filter members being of stencil board and having perforations with flanges on the inner surfaces thereof, adjacent filter members having flange edges for receiving a similar flanged edge of an adjacent filter member whereby an effective filter assembly is provided in which the tent shape filter member can be readily cleaned by brushes without removal of the filter element and the filter element can be readily replaced when necessary.

14. A filter assembly comprising a rectangular frame having peripheral walls of Z-shaped section, an angle strip mounted on each side wall and extending outwardly and diverging away from the inturned flange of such side walls, said angle strip being secured by self-threading bolts extending into extruded flange openings in said side walls, one or more gable shape skeleton supports extending from the inturned flange edge of said rectangular frame, said skeleton support including a plurality of rafters converging from spaced relation adjacent said rectangular frame to a ridge spaced therefrom, longitudinal braces connecting said rafters and a ridge brace connecting the converging ends of said rafters, transverse braces extending between corresponding longitudinal braces of the rafters of one roof section of the gable-shaped skeleton support to prevent relative movement of the sections, at least one longitudinal brace parallel with the ridge adjacent the eave ends of said rafters, the verge rafters being of greater length than the intermediate rafters and extending beyond the eave ends of the intermediate rafters and overlapping the end walls of said rectangular frame, said verge rafters having large eyes formed therein to loosely surround attaching bolts, a plate having a right angle flange at one end mounted with its right angle flange between the eave ends of said verge rafters and located between the inturned and outturned flanges of said rectangular frame, the opposite edge of each of said plates having an angularly extending flange portion converging inwardly from the end walls, the other edges of said plates being unflanged and provided with notches receiving the verge rafters, a clip having spring fingers extending from a cross member and having eyes at the ends of the cross member registering with the eyes in the eave ends of the verge rafters, self-threading bolts extending through the eyes in said clip, through apertures in said end plates through eyes in the eave end of the verge rafters and threaded into extruded flange openings in said end walls thereby securing said clips, said plates, and said skeleton supports to said frame, the ends of the spring fingers of said clips diverging outwardly from the converging flanges of said plates and adapted to receive and guide a filter element between the converging flanges of said plates and the diverging ends of the stems of the clip, and a filter element of strong stencil board of a thickness in the order of 15⁵⁄₁₀₀₀ inch formed in trapezoidal shape and secured on said skeleton support by said clips engaging the end portions of the trapezoidal shaped filter adjacent the slant sides thereof whereby an effective filtering assembly is provided.

15. The invention according to claim 14 in which a plurality of skeleton supports are provided on a single rectangular frame and adjacent longitudinal braces at the eave edges of such skeleton supports are connected together and held in accurate relation by U-shaped clips therebetween with the ends of the legs secured to the longitudinal braces and the bight portion located between the flanges of said rectangular frame to assure that the flange edges of stencil board filter elements used therewith will interengage and be maintained in positive sealing relation with similar filter elements on adjacent skeleton supports.

16. The invention according to claim 15 in which the braces between the longitudinal braces at the frame ends of the skeleton support adjacent a side wall thereof engage the inturned flange of such side wall to maintain resilient pressure thereon to prevent objectional vibration.

17. The invention according to claim 16 in which the longitudinal braces of the adjacent skeleton support adjacent the frame are closely positioned so a flange of a small size in a filter member will maintain effective sealing relation with an adjacent flange of an adjacent filter member to provide an effective seal.

18. The invention according to claim 17 in which the stencil board filter has 1/16 inch perforations with flanges therearound, said perforations being spaced 7/64 inch apart, said filter element including two trapezoidal shaped sheets with the flanges of the apertures extending toward each other, and said sheets secured together on the slant edges and short base of the trapezoid, each stencil board sheet having a scored line adjacent the long base providing a flange for interengagement with similar filter elements on adjacent skeleton supports.

19. The method of making tent shaped filter elements comprising perforating central portions only of sheets of high density stencil board manufactured from soft wood kraft fiber and treated with a 14 to 18% blend of mineral and oxidizing oils and of a thickness in the order of 15½ point caliper, said perforating being performed in a manner to provide flanges around each aperture on one surface of the stencil board, the other surface being smooth and free of upstanding projections, placing a stencil board perforated sheet with respect to a similar stencil board perforated sheet with the flanges of the aperture of one stencil board sheet extending toward the other stencil board sheet, and securing the edges of the sheets of stencil board sheets together on three edges in the shape of two slant sides and the short base of a trapezoid to provide an effective filter which may be opened on its unsecured long base edge of the trapezoid for support on a gable shape support in which the air may pass over the filter in a direction from the short base toward the long base at an obtuse angle to the surface of the sheets and particles in the air will collect on the stencil board on the edges of the apertures and the flanges thereof adjacent the long base edge or open side of the tent shaped filter.

20. The method according to claim 19 in which a flange is provided on the long base edge by a score line formed to facilitate bending.

21. A filter unit comprising a substantially rectangular base frame having a continuous peripheral wall of rectangular shape and a continuous outwardly extending flange at one edge of said peripheral wall and a continuously inwardly extending flange on the other edge of said continuous peripheral wall, at least one gable-shaped skeleton frame supported on said base frame and extending outwardly therefrom on the edge having the inwardly extending flange, a tent-shaped stencil board filter element mounted on said at least one gable-shaped skeleton frame, said tent-shaped filter element having a flange at each eave edge extending at an angle to the associated roof section at the eave edges thereof to provide a seal at the eave edges of said filter element, said filter element being provided with a plurality of perforations formed therein by a punching operation thereby providing an inwardly extending peripheral flange around each perforation, said filter unit adapted to be used with the eave edges extending vertically whereby dust accumulated on the outer surface of the tent-shaped filter element may be brushed away by movement downwardly in a vertical direction whereby the force of gravity assists in the removal of the dust.

22. The method of making a tent-shaped filter element comprising perforating trapezoidal sheets or stencil board while providing flanges around the perforations on one side thereof, placing a pair of perforated stencil sheets with the flanges of the perforations of one sheet extending toward the other sheet, temporarily securing the sheets in position and forming a securing seam defining the slant sides and short base of a trapezoid on said sheets, a portion of the stencil board at the long base of each trapezoid providing material for a flange to be bent at an angle from the long base edge of the sheet whereby ends of the tent shape filter are formed by the marginal portion adjacent the seams on the slant sides of the trapezoid and similar stencil board tent shaped filter elements may be positioned in side by side relation with the flanges thereof in interengagement.

References Cited in the file of this patent

UNITED STATES PATENTS

| | | |
|---|---|---|
| 311,036 | Rollins | Jan. 20, 1885 |
| 1,327,287 | Miller et al. | Jan. 6, 1920 |
| 1,548,839 | Henshall | Aug. 11, 1925 |
| 2,395,660 | Galson | Feb. 26, 1946 |
| 2,654,440 | Robinson | Oct. 6, 1953 |
| 2,876,862 | Hummel | Mar. 10, 1959 |
| 2,907,408 | Engle et al. | Oct. 6, 1959 |

FOREIGN PATENTS

| | | |
|---|---|---|
| 296,128 | Germany | Jan. 13, 1917 |
| 312,697 | Germany | June 2, 1919 |
| 449,912 | Great Britain | July 7, 1936 |